United States Patent [19]

Youssef et al.

[11] Patent Number: 4,762,545

[45] Date of Patent: Aug. 9, 1988

[54] SOIL AMENDMENT MATERIAL AND PROCESS FOR PREPARATION THEREOF

[76] Inventors: Nabil N. Youssef, 2168 N. 1450 East, North Logan, Utah 84321; Gene W. Miller, 935 S. 400 East, Providence, Utah 84321

[21] Appl. No.: 936,519

[22] Filed: Dec. 1, 1986

[51] Int. Cl.<sup>4</sup> ............................................. C05G 3/04
[52] U.S. Cl. ........................................ 71/27; 71/903; 71/904; 71/64.12
[58] Field of Search ............... 71/3, 903, 904, DIG. 1, 71/27, 64.12

[56] References Cited

U.S. PATENT DOCUMENTS

4,058,124 11/1977 Yen et al. .......................... 71/64.12
4,540,427 9/1985 Helbling ................................. 71/3

Primary Examiner—Ferris H. Lander
Attorney, Agent, or Firm—A. Ray Osburn

[57] ABSTRACT

A soil amendment material and an associated process for the preparation thereof, comprising a water swellable hydrophilic polymer infused with high concentrations of plant nutritive salts. The amendment is prepared by repeated soaking of hydrophilic swellable polymer particles in a solution of nutritive salts in water, followed by heat application to drive off the entrained water, leaving the nutrients entrapped in the polymer particles.

1 Claim, 3 Drawing Sheets

SOIL AMENDMENT MATERIAL AND PROCESS FOR PREPARATION THEREOF

BACKGROUND OF THE INVENTION

1. Field

The field of the invention is methods for effectively fertilizing growing plants and methods for producing substances for use in such methods.

2. State of the Art

Obtaining optimum food producing productivity of soil and other plant growing mediums is largely a problem of providing proper nutrition for production of increased biomass of the plants. Although green plants, being true autotrophs, supply the many organic components necessary for growth through photosynthesis, they nevertheless require essential mineral nutrients taken from the soil by the roots. Oxygen, carbon, hydrogen and 13 known mineral nutrients are needed for plant development through their complete life cycles. However, nutrients present in the soil are not available to the plant unless they are in suitable chemical form, and various related soil and nutrient factors are also involved. Paramount among these are the concentration of the nutrient in the soil, the solubility of the nutrient when present, its cation charge capacity, the root form and structure of the plant being grown, the texture of the soil and its structure, atmosphere and acidity or alkalinity.

Natural soils vary with respect to these growth influencing factors. For example, the productivity of desert and short grass prairie soils in the Western United States is only one or two percent of the productivity of salt marshes in Georgia. Although this is partially the result of low rainfall in the west, poor soil fertility and structure are also involved. The addition of missing nutrients to soils has been long practiced with beneficial results. However, current practices, generally the simple addition of fertilizers to soils, are in most cases very wasteful, unnecessarily expensive, inefficient in terms of plant utilization and even environmentally detrimental. Significant amounts of fertilizer is lost directly through leaching and is not available when needed during the growing period. Sometimes the nutrient becomes captured in insoluble compounds and is unavailable for plant utilization. Sometimes the necessary presence of essential nitrogen fixing bacteria and mycorrhizai fungi is lacking, very important to root growth for healthy plant growth. Another common problem is application of excess quantities of nutrient salts, resulting in plant "burn", with stunted growth or even death.

These problems have caused consideration of more sophisticated methods of adding nutrients to deficient soils. A certain amount of attention has been given to various insoluble swellable polymers which have the ability to absorb up to hundreds of times their weight in water, water base solutions, and other liquids. In general, these have been designed as soil amendments to improve soil structure and retain water, greatly increasing the water-holding capacity of the soil. Examples of such swellable, water insoluble polymers include a gelatinized starch hydrolyzed polyacrylonitrile graft copolymer using potassium hydroxide, a cross-linked matrix of polymeric alkylene either, water insoluble homopolymers and copolymers of alkylene and hydrocarbon substituted alkylene ethers, and others. See U.S. Pat. Nos. 3,997,484, 3,336,129, 3,900,378 and 4,402,725, which variously deal with swellable polymers and plant nutrition and soil conditioning.

The water insoluble swellable polymers have been used as granular soil additives to absorb and retain water supplied by rainfall or irrigation. Growing plant roots are ablae to in many instances take the moisture directly from the swollen particles. The water otherwise tends to be held in the particles as in a reservoir so as not to flow of its own accord into and out of the soil or to lower remote soil strata. Such particles have been used in this manner beneficially when the fertilizer nutrients are added separately to the same soil. However, leaching of fertilizers in this situation is to be expected and is wasteful. Further, the more or less uniform dispersion of the polymer particles and fertilizer through the soil causes much of the moisture and nutrients to be remote from many plants roots, so that it cannot be beneficially utilized. Previous investigators have also conceived the possibility of charging insoluble, swellable polymer particles with nutrient containing solutions for subsequent release for plant growth. See U.S. Pat. No. 3,336,129. However, no practical enabling method of doing so to achieve the nutrient concentrations needed for best results has been developed or disclosed. Thus, practical exploitation of insoluable swellable polymers with nutrients, microbial inoculants, pesticides, herbicides and growth regulators has heretofore been wanting in the soil amendment and plant nutrient technology. Further, the prior art does not disclose any awareness of the desirability of incorporating combinations of essential nutrients into the matrices of water swollen particles for maximum production of plant biomass through completely balanced nutrition.

BRIEF SUMMARY OF THE INVENTION

With the foregoing in mind, the present invention eliminates or substantially alleviates the foregoing shortcomings in the prior art of soil amendment for maximum plant growth and production of harvestable biomass. The invention comprises a class of materials for amending soil to improve its structure, water and nutrient retention, plant nutrient content, and capability for supplying nutrition to the growing plants over their entire life cycle, along with a method of preparation of the soil amendment materials. The method of preparation provides for the incorporation of all required nutrients into a single material, for application to particular soils for particular plants. Selectively, however separately prepared amendment materials may be combined to achieve this goal.

The soil amendment material is prepared by providing finely divided water insoluble hydrophilic, swellable polymer particles, preparing an aqueous solution of selected nutrient-containing salts, followed by mixing the resulting solution with the polymer particles, so that it is absorbed into their molecular structures. The soaking solution, to avoid breakdown of the polymer structure, must with many nutrient salts, be so diluted that a single impregnation does not infuse the polymer with sufficient nutrient. Therefore, multiple infiltration (soaking) cycles are utilized, each followed by a drying cycle to expel the water from the polymer particles. Each infiltration incrementally increases the concentration of the nutrients within the polymer structure. The final infiltrated particles may then be finally dried, and applied to the soil, or handled and shipped as dry granular material. The particles are preferably applied locally near the growing plants roots, for maximum utilization of the entrapped nutrients. The roots grow about and sometimes through particles and extract the dissolved nutrient material along with the water.

According to one aspect of the invention, separate nutrient salts are infused into separate parts of polymer particles. The total nutrient requirement may then be fulfilled by mixing the separate parts proportionately together before applying the resulting mixture to the soil. Or, a single quantity of particles may be sequentially infiltrated with all the required nutrients. Preferably, however, a single aqueous solution containing all the required nutrient salts in proper proportions is used to infuse a single quantity of polymer particles to provide the total nutrient requirement.

It is therefore the principal object of the invention to provide soil amendment materials comprising swellable hydrophilic polymer particles infused with high concentrations of multiple nutritive salts for plants, along with a process for preparation thereof.

BRIEF DESCRIPTION OF THE DRAWINGS

In the drawings, which graphically compare the growth performance of various plants as effected by the use of various nutrients and combinations and application methods, including the use of prepared soil amendments in accordance with the invention.

DETAILED DESCRIPTION OF SOIL AMENDMENT PREPARATION AND APPLICATION

In contrast to traditional methods of soil fertilization, wherein nutrients are added directly to the soil, the methods described herein require the incorporation of selected nutrients into water insoluble polymer particles having the capability of taking on large quantities of water into which the nutrients have been previously dissolved. The nutrient and water-containing polymer is dispersed into granular form and then placed into the soil. The water and nutrient salts are held within the swollen polymer until extracted by the roots for use by the growing plant. The loss of fertilizing nutrients by leaching is thus prevented. The particles are preferably placed near to the germinating seed or the planted seedling. The particles may contain a supply of the total nutrient demand of the plant for complete growth to harvest. The nutrients may be tailored to compensate for any nutrient deficiency in the soil, to again provide complete plant requirements. Even very poor soil with very little nutrient value may produce economically viable, even "bumper", crops.

Plants are generally recognized to require 13 essential nutrient elements for growth. This is in addition to carbon dioxide ($CO_2$), oxygen ($O_2$), and hydrogen (H). Required in relatively large amounts, each therefore designated a "macronutrient" are the elements nitrogen, phosphorous, potassium, calcium, sulfur, and magnesium. Those required in lesser quantities (each designated a "micronutrient") are iron, manganese, boron, and zinc. Those required in such small amounts as to be designated "sub-micronutrients" include molybdenum, copper and chlorine. Some plant species require further nutrient elements, some of which may in fact be beneficial to all plants. These include the element cobalt, for example, which is required by those plants dependent upon nitrogen fixation. Plants with certain photosynthetic systems may require the element sodium, which may in part substitute for potassium in other plants. Selenium is another element not required for many plants, but required for *Astragalus spp.*

Preparation of the Nutrient Containing Polymer Particles

There are at present several known hydrophillic, water insoluble, swellable polymers each having the ability to repeatedly absorb solution in amounts weighing many times, some hundreds of times its own weight. Upon heating, each water containing polymer gives up its water and retains its ability to re-absorb through many cycles. Examples include polyvinyl pyrrolidon, polyacrylamide, hydroxyethyl cellulose, starch hydrolized polyacrylonitrile, and polyvinylamine. See U.S. Pat. No. 4,058,124 for an extensive listing of these and other examples. All are believed to be nontoxic to plant growth and development, but this must always be confirmed before a particular polymer may be finally selected. They are further believed to be stable in the soil environment, so as to last at least the growing period of the plant. Conversely, unduly extended polymer survival may be undesirable in some instances, to avoid build up of polymer particles in the soil as they are added with succeeding crops. All promise to be capable of producing small grain sizes to provide the large surface areas desirable for contact by the root systems of the growing plants for water and nutrient extraction. The selected material must also be compatible with the nutritive element containing salts which are suitable for nutrient element extraction therefrom by the plants. That is, the selected polymer must not be permanently changed in molecular structure by these salts, or other additives with which it may be charged. Of these, polyacrylamide proved to be very satisfactory, as subsequently discussed, accepting the desired nutrients, fractionating to desirable size, and promising to last a season or two in the soil, and to break down thereafter.

After a suitable hydrophilic polymer has been selected, and the desired amount of a specific nutrient element determined by analysis of the soil and the specific plant requirements, charging of the polymer proceeds with the following steps:

A. Selection of a suitable salt containing the nutritive element desired.

B. Preparation of an aqueous solution of the selected salt of suitable concentration.

C. Infiltration of the salt solution into the polymer by soaking.

D. Decanting any remaining unbound solution.

E. Drying of the polymer to expel the absorbed water, leaving the nutrient salt bound in the polymer, and F. Repeating the above Steps C. and D. through sufficient cycles to build up the nutrient content in the polymer to the desired level.

The number of absorption-drying cycles required varies with the desired concentration of the particular nutrient, and also upon the particular salt employed and its concentration in the soaking solution. The soaking solution must be of sufficiently low concentration to avoid breakdown of the polymer structure. Generally, this would preclude entrapment of sufficient nutrient for plant requirements into a reasonable amount of polymer. However, it has been discovered that the polymer will, with repeated soaking and drying tolerate much greater total amounts of salts without molecular damage. Examples of solution preparation for polyacrylamide are presented subsequently.

Soaking solutions may be provided in quantities to be entirely absorbed by the swelling particles. Or, solution quantities may be in excess of their absorbing capacity, in which case the excess not bound by the particles is decanted, step D., after the soaking period before the subsequent drying period. Either way, the concentration of the salt in the polymer particles may be directly calculated. However, the binding capacity of the polymer varies with the various salts utilized in the solution. This individual capacity must be determined experimentally for each salt solution. For example, whereas the polymer may bind 200 times its weight of water, it may be able to absorb only 50 times its weight of some salt solutions.

As indicated above, each nutrient element must be selected by consideration of the known plant requirement for the nutrient element and its presence in the soil in plant-available form. It may be necessary to test and analyze the soil by state of the art methods to determine which elements are present, their amounts and the forms in which they are present. Therefore, the elements selected, and the salt containing it, both vary from one group of plants to another and from one soil to another.

The total nutrient requirements of a plant could be satisfied by impregnated polymer particles in one of three ways, all utilizing the impregnation-drying cycle approach indicated above. First, separate portions of particles could be infiltrated with each of the required nutrient salts, the total nutritive requirement of the plant then being satisfied by mixing the impregnated particles in correct proportions. Secondly, a single quantity of particles could be repeatedly infiltrated with successive ones of the required nutritive salts. Then, the final infiltrated polymer would include all of the nutrition requirements needed to be added to the soil. Thirdly, the soaking solution could be prepared to contain all of the required nutrient salts in correct proportions, and used to infiltrate a single quantity of particles with all nutrients simultaneously. Of these, the third approach is preferred, because it requires fewer soaking/drying cycles to provide the final nutrient impregnated material required. However, care must be exercised to assure that incompatible chemicals are not mixed together into the soaking solutions. Undesirable reactions might occur, or precipitation of some of the salts might be triggered by others. In this event some suitable combination of the approaches to impregnation would be indicated.

Preparation of the soaking solutions, on a laboratory scale, is exemplified by Table I below:

TABLE 1

| Nutrient Composition Formula #1 | | | | | | |
|---|---|---|---|---|---|---|
| 1. Nutrient Containing Salt Solution | 2. Plant Available Element | 3. Concentration of Prepared Stock Solution | 4. Soaking Solutions (Ml of stock solution per liter) | | | |
| | | | A | B | C | D |
| $KH_2PO_4$ | P,K | 1 Molar | 10 | 20 | 30 | 50 |
| $KNO_3$ | K,N | 1 Molar | 50 | 100 | 150 | 250 |
| $Ca(NO_3)_2$ | Ca,N | 1 Molar | 50 | 100 | 150 | 250 |
| $MgSO_4$ | Mg,S | 1 Molar | 20 | 40 | 60 | 100 |
| $H_3BO_3$ | B | 500 ppm of metal | 10 | 20 | 30 | 50 |
| $MnCl_2$ | Mn,Cl | 500 ppm of metal | 10 | 20 | 30 | 50 |
| $ZnCl_2$ | Zn,Cl | 50 ppm of metal | 10 | 20 | 30 | 50 |
| $CuSO_4$ | S,Cu | 20 ppm of metal | 10 | 20 | 30 | 50 |
| $Na_2MoO_4$ | Mo,Na | 10 ppm of metal | 10 | 20 | 30 | 50 |
| FeEDDHA | Fe | 1000 ppm of metal | 20 | 40 | 60 | 100 |

Several well known nutritive salts are listed in column 1, at the left. These salts will ultimately be incorporated into the polymer structure. Each salt is known to provide the plant nutritive elements listed in column 2. In this example, stock solutions in water of each of the salts is prepared to the concentrations shown in column 3. Note that, for those salts providing the "macronutrients", relatively concentrated stock solutions of 1 molar were prepared. However, for those elements required in much lesser quantities, herein designated "micronutrients" or "sub-micronutrients", much less concentrated stock solutions are prepared. The concentrations of these solutions are designated in parts per million (ppm) of the nutritive element (metal) itself.

The above table represents the preparation of soaking solutions in four strengths or concentrations, designated "A", "B", "C" and "D". The "C" and "D" concentrations are two, three and five times the "A" concentration. The concentration of each salt in the "D" solution is five times that of the same salt in the "A" solution, for example. To prepare the final soaking solution "A", for example, 10 ml. of the potassium hydrogen phosphate stock solution is added to one liter of water, as is 50 ml. of potassium nitrate stock solution, and so on until the indicated milliliters (ml) of all of the stock solutions have been added together to the same original liter of water. (However, it was found necessary to add the salts $KH_2PO_4$, $Ca(NO_3)_2$ and $MgSO_4$ all separately after other salts were impregnated into the particles, to avoid precipitation of some salts from the solution.) Experimentation with the increasingly concentrated solutions "A"–"D" permitted some subsequent evaluation of the most desirable concentration for the individual plant species although this is also greatly dependent on soil used. Also, some evaluation of the maximum allowable soaking concentrations was possible, although this was not precisely determined. However, the undiluted molar concentrations were shown to be definitely unacceptable for $Ca(NO_3)_2$, $KH_2PO_4$ and $MgSO_4$, at least with the particular polymer used. That is, the polyacrylamide was incapable of infiltration using soaking solutions of molar concentrations of all of these salts together, without molecular breakdown. However, molar soaking concentrations of a single one of these salts could be used successively without polymer breakdown. Of course, the stock concentrations of the micronutrients, indicated in ppm, represented no problem in this respect.

With the soaking solutions prepared, the infiltration could then proceed by soaking dry polymer particles in the selected nutrient solution followed by oven drying, the concentration of nutrients within the particles increasing with each cycle. The proportions of soaking solution and particles for each soak and dry cycle was determined experimentally and as expected varied with the polymer utilized and the nutrients employed. With polyacrylamide and the above indicated solution concentrations, it was found that 200 ml. of nutritive mix was easily accommodated by 30 grams of dry particles. The particle quantity was infused in this manner through five cycles, thus accommodating a full liter of the nutritive solution represented by the table above. The particles fully expanded in only 2 or 3 minutes. The selected oven temperature was 120° C. to which the swollen particle mass was subjected for an arbitrary overnight period in each cycle. Shorter periods might prove sufficient with refinement of the cycle. The oven temperature was selected to expel not only the bulk of the water but also that held hygroscopically in the particle while not thermally damaging the basic polymer structure. Of course, lower temperatures could be utilized if preferred, since absolute dryness is not necessary before infusion with the solution.

The nutritive salts of Table I are from among those commonly known to provide plant available elements. See Tables II through V for other combinations, indicating additions and deletions to Formula No. 1. e.g., Formula #3, Table II, consists of Formula #1 with $Ca(NO_3)_2$ removed and $CaCl_2$ and $(NH_4)_2SO_4$ added.

TABLE II

| | | | 4. | | | |
|---|---|---|---|---|---|---|
| 1. | 2. | 3. | A | B | C | D |
| *$Ca(NO_3)_2$ | Ca,N | 1 Molar | 0 | 0 | 0 | 0 |
| $CaCl_2$ | Ca,Cl | 1 Molar | 5 | 10 | 15 | 25 |
| $(NH_4)_2SO_4$ | N,S | 1 Molar | 50 | 100 | 150 | 250 |

Nutrient Composition Formula #3

*Contained no $Ca(NO_3)_2$

TABLE III

Nutrient Composition Formula #4

| | | | 4. | | | |
|---|---|---|---|---|---|---|
| 1. | 2. | 3. | A | B | C | D |
| *$KNO_3$ | K,N | 1 Molar | 0 | 0 | 0 | 0 |
| *$Ca(NO_3)_2$ | Ca,N | 1 Molar | 0 | 0 | 0 | 0 |
| KCl | K,Cl | 1 Molar | 50 | 100 | 150 | 250 |
| $CaCl_2$ | Ca,CL | 1 Molar | 5 | 10 | 15 | 25 |
| $(NH_4)_2SO_4$ | N,S | 1 Molar | 50 | 100 | 150 | 250 |

*Contained no $KNO_3$ or $Ca(NO_3)_2$

TABLE IV

Nutrient Composition Formula 5

| | | | 4. | | | |
|---|---|---|---|---|---|---|
| 1. | 2. | 3. | A | B | C | D |
| $KNO_3$ | K,N | 1 Molar | 10 | 20 | 30 | 50 |
| $Ca(NO_3)_2$ | Ca,N | 1 Molar | 10 | 20 | 30 | 50 |
| *$MgSO_4$ | Mg,S | 1 Molar | 0 | 0 | 0 | 0 |
| $CaCl_2$ | Ca,Cl | 1 Molar | 20 | 40 | 60 | 100 |
| $(NH_4)_2SO_4$ | N,S | 1 Molar | 40 | 80 | 120 | 200 |
| $MgCl_2$ | Mg,Cl | 1 Molar | 20 | 40 | 60 | 100 |

*Contained no $MgSO_4$ and reduced amounts of $Ca(NO_3)_2$

TABLE V

Nutrient Composition Formula 6

| | | | 4. | | | |
|---|---|---|---|---|---|---|
| 1. | 2. | 3. | A | B | C | D |
| $KNO_3$ | K,N | 1 Molar | 0 | 0 | 0 | 0 |
| *$Ca(NO_3)_2$ | Ca,N | 1 Molar | 0 | 0 | 0 | 0 |
| $CaCl_2$ | Ca,Cl | 1 Molar | 10 | 20 | 30 | 50 |
| KCL | K,Cl | 1 Molar | 50 | 100 | 150 | 250 |
| $MgCl_2$ | Mg,Cl | 1 Molar | 20 | 40 | 60 | 100 |
| $NH_4NO_3$ | N | 1 Molar | 15 | 30 | 45 | 75 |

*Contained no $KNO_3$, $Ca(NO_3)_2$ or $MgSO_4$

Some of these solutions required greater dilution to be tolerated by the polymer used, additional soak and dry cycles then being needed. Even at low concentrations, salts containing nitrogen gave especial trouble. Thus, solution preparation must be varied with the salts selected. However, very high salt content my be achieved in the infused polymer - 87% salt (dry weight) using Formula #3. ($KH_2PO_4$ and $MgSO_4$ infused separately)

Some initial question also existed about the number of soaking and drying cycles the polymer could withstand without molecular breakdown. Accordingly, a sample of polyacrylamide particles was subjected to seventeen soak and dry cycles using an oven at 120° C. Water was used only sparingly in the soak cycle. The polymers withstood the seventeen repeated soak and heating cycles without discernible damage to its structure. This did not establish a definite limit on the number of permissible cycles, but did indicate the capability of the polymers for many more cycles than likely to be required in preparing the nutritive infused polymer.

It is well known that many plants cannot tolerate high amounts in the soil of some of the salts shown in Tables I-V, causing concern for the use of comparable quantities of the salts in the soil, although incorporated into the polymer structure. The soaking solutions "A" through "C" produced a corresponding range of concentration of particle entrapped salts. Prepared materials of the resulting range of salt concentrations were used with several types of plants, including radishes, chard, mustard, tomatoes, red beets, and sweet peas. All of the plants when started from seed in the polymer mix tolerated even the strongest "D" (50 times nutrient concentration found in normal nutrient solution.) concentration with no ill effects and with greatly promoted growth. However, when tomato plants were transplanted to the polymer mix, they thrived on concentration "A".

Effect Upon Plant Growth of the Nutrition Infused Polymer Particles in Growing Mediums, Including Soil To assess the growth enhancing effectiveness of the prepared nutrition infused particles in comparison to other methods of fertilization, both with and without such material, the tests conducted included the following categories:

1. Plants grown in essentially nutrition-free medium without the addition of nutrients, with water provided but without polymer particles in the medium.

2. Plants grown in essentially nutrition-free medium irrigated with complete nutrition solutions, but without polymer particles in the medium.

3. Plants grown in essentially nutrition-free medium containing nutrition-free polymer particles, but with nutritive solutions added to the medium-particle mixture.

4. Plants grown in essentially nutrition-free medium containing initially dry nutrient infiltrated particles, with water added periodically.

5. Plants grown in nutrition-poor soil with water added but no polymer particles.

6. Plants grown in nutrition-poor soil with nutrition infiltrated particles, water added.

7. Plants grown in essentially nutrition-free medium with polymer particles added and water provided.

8. Plants grown in nutrition-poor soil with initially nutrition-free polymer particles, with nutrition solution added to the particle-soil mixture periodically.

9. Plants grown in nutrition-poor soil with particles added, followed by periodic watering.

10. Plants grown in nutrition-poor soil without polymer particles, with nutrient solution added periodically.

Essentially nutrition-free growing mediums were utilized, including Perlite, sand and Vermiculite. In those experiments involving polymer particles in the medium, whether nutrition infused or nutrition-free, about 2¼ grams of dry particles were used in a container having 1,000 cc of the medium. Since three plants were grown in each container, 0.75 grams of dry particles were used per plant. Polymer particles infused with each of the concentrations "A", "B", "C" and "D" were used to obtain comparative effects upon plant growth.

Numerous growing experiments were conducted, and many plants species investigated, as indicated above. Illustrative examples are summarized herein, and the following conclusions can be drawn for all species investigated:

a. Plants grown under category "1" showed no significant growth, reflecting the nutrition-poor growing medium.

b. Plants grown under category "2" showed substantial growth, reflecting the effect of complete nutrition added to the growing medium by conventional fertilization.

c. Plants grown under category "3" showed substantially increased growth over those grown in condition "2" reflecting the ability of the polymer particles to hold the water for use of the plant in a nutrition rich soil.

d. Plants grown under category "4" generally greatly outstripped those grown under condition "3", even though the total nutrients added to the soil was several times less than those added in conditions "2" and "3".

e. Plants grown under category "5" showed a small amount of growth, reflecting utilization of the small amount of nutrition contained in the soil, but less than those of category "2".

f. Plants grown under category "6" showed very significantly increased growth over those of category "5".

g. Plants grown under category "7" showed improvement in growth over those of category "1", reflecting the absence of significant nutrition even with the water-retaining particles present.

h. Plants grown under category "8" showed significant growth increase, but less than those having the nutrition infused particles at comparable solution concentrations, reflecting the presence of less available nutrient in the soil even with repeated application of the solution.

Figure 1:
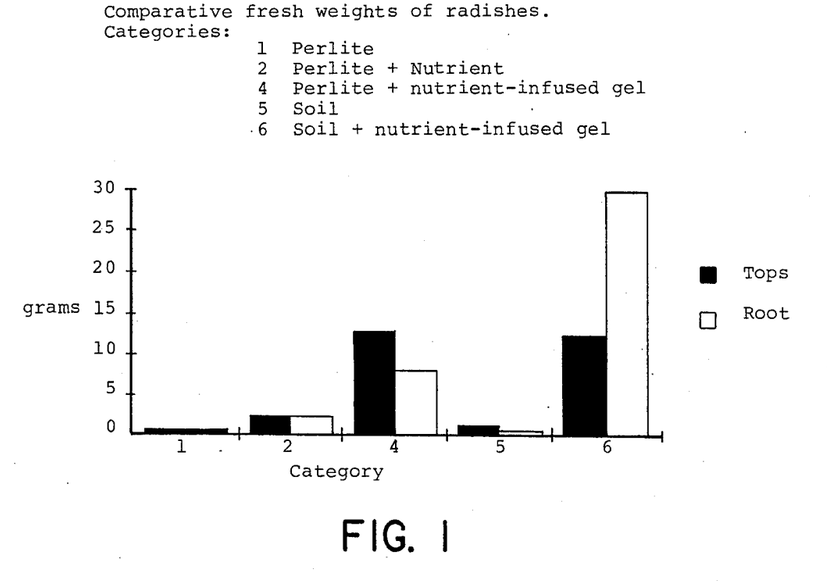
FIG. 1 shows comparative fresh weights of radishes grown in perlite and soil, FIG. 2 comparative fresh weights of red beets grown in perlite and soil, FIG. 3 comparative fresh weights of sweet peas grown in perlite and soil, FIG. 4 comparative dry weights of radishes grown in perlite, and FIG. 5 comparative dry weights of radishes grown in soil.
Figure 2:
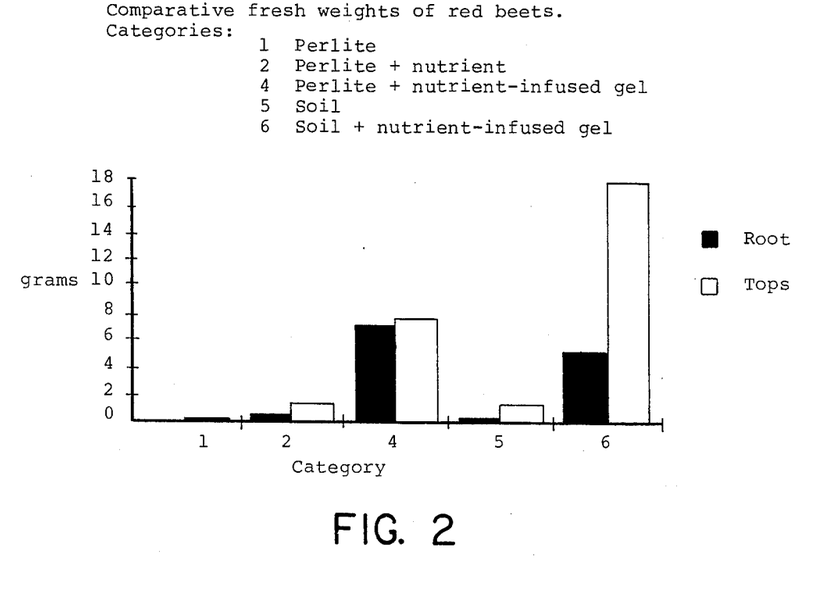
Figure 3:
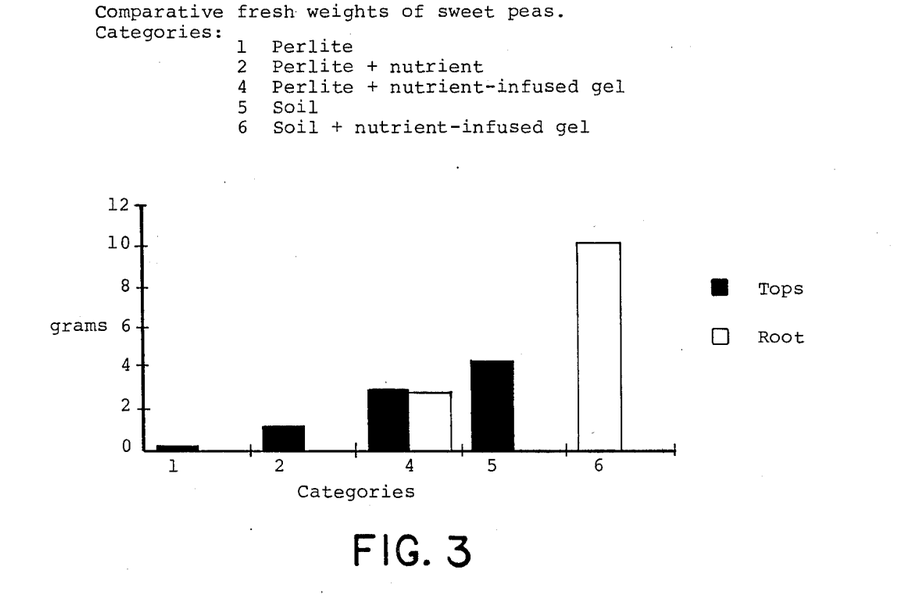

The experiments considered together support the conclusion that providing the nutrients by means of nutrient infused polymer particles produces much more growth in all plants tested than does any other fertilization method using the same nutrients. FIGS. 1-3 graphically compare growth results with methods of nutrient application for radishes, red beets and sweet peas, using the previously discussed nutrient composition Formula "1", with soaking solution concentration "A". Tables VI and VII list the same results, presented in terms of both fresh and dry weights.*

TABLE VI

Nutrient Composition, Formula #1
Comparative Growth of Radish, Red Beet and Sweet Pea in 44 days

| Plant | Category | Fresh Weight Top | Fresh Weight Root | Dry Weight Top | Dry Weight Root |
|---|---|---|---|---|---|
| | | (Average of 3 Plants, Grams) | | | |
| Radish | 1 (Perlite Alone) | 0.232 | — | 0.020 | — |
| Sweet Pea | 1 (Perlite Alone) | 0.345 | — | 0.032 | — |
| Red Beet | 1 (Perlite Alone) | 0.130 | — | 0.005 | — |
| Radish | 2 (Perlite & Nutrient) | 2.60 | 2.59 | 0.447 | 0.271 |
| Sweet Pea | 2 (Perlite & Nutrient) | 1.060 | — | 0.219 | — |
| Red Beet | 2 (Perlite & Nutrient) | 1.280 | 0.400 | 0.156 | 0.046 |
| Radish | 4 (Perlite & Nutrient Infused Gel) | 13.516 | 8.788 | 1.881 | 0.920 |
| Sweet Pea | 4 (Perlite & Nutrient Infused Gel) | 2.861 | 2.768 | 0.547 | 0.274 |
| Red Beet | 4 (Perlite & Nutrient Infused Gel) | 7.349 | 6.895 | 0.597 | 0.833 |

*In the comparative growth figures and tables, the commonly used term "gel" is employed for the swellable polymer. Seeds were planted for all comparative growth data in all the tables and figures, except for Table X. FIGS. 1-5 are in APPENDIX A, Page 23.

TABLE VII

Nutrient Composition, Formula #1
Comparative Growth of Radish, Red Beet and Sweet Pea In 44 Days

| Plant | Category | Fresh Weight Top | Fresh Weight Root | Dry Weight Top | Dry Weight Root |
|---|---|---|---|---|---|
| | | (Average of 3 Plants, Grams) | | | |
| Radish | 5 (Soil) | 1.639 | 1.139 | 0.318 | 0.235 |
| Sweet Pea | 5 (Soil) | 4.367 | — | 0.475 | — |
| Red Beet | 5 (Soil) | 1.008 | 0.225 | 0.092 | 0.037 |
| Radish | 6 (Soil & Nutrient infused Gel) (Conc. A.) | 12.910 | 29.876 | 1.460 | 2.500 |
| Sweet Pea | 6 (Soil & Nutrient infused Gel) (Conc. A.) | 10.038 | — | 1.201 | — |
| Red Beet | 6 (Soil & Nutrient infused Gel) (Conc. A.) | 17.153 | 4.895 | 2.014 | 0.791 |

Figure 4:
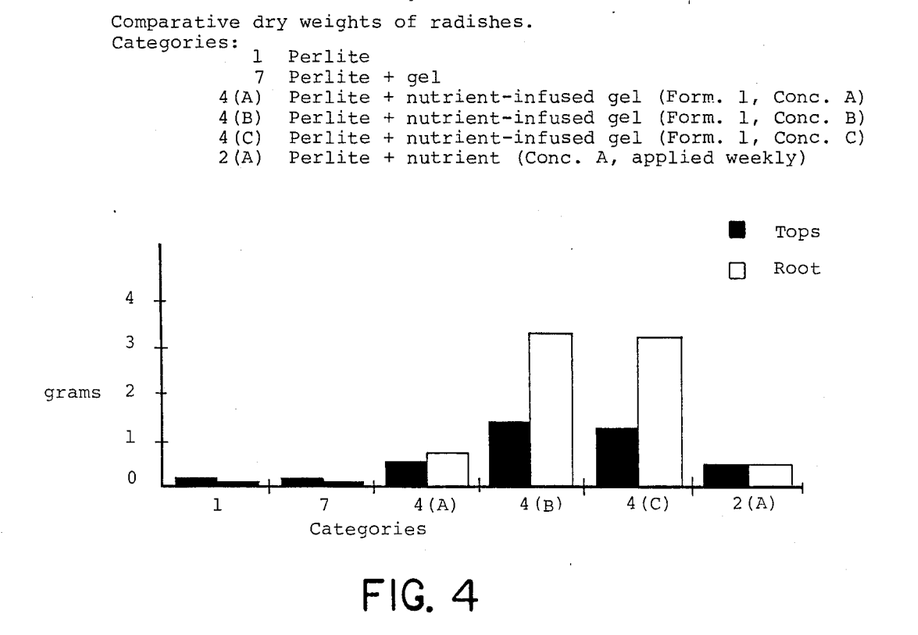
Figure 5:
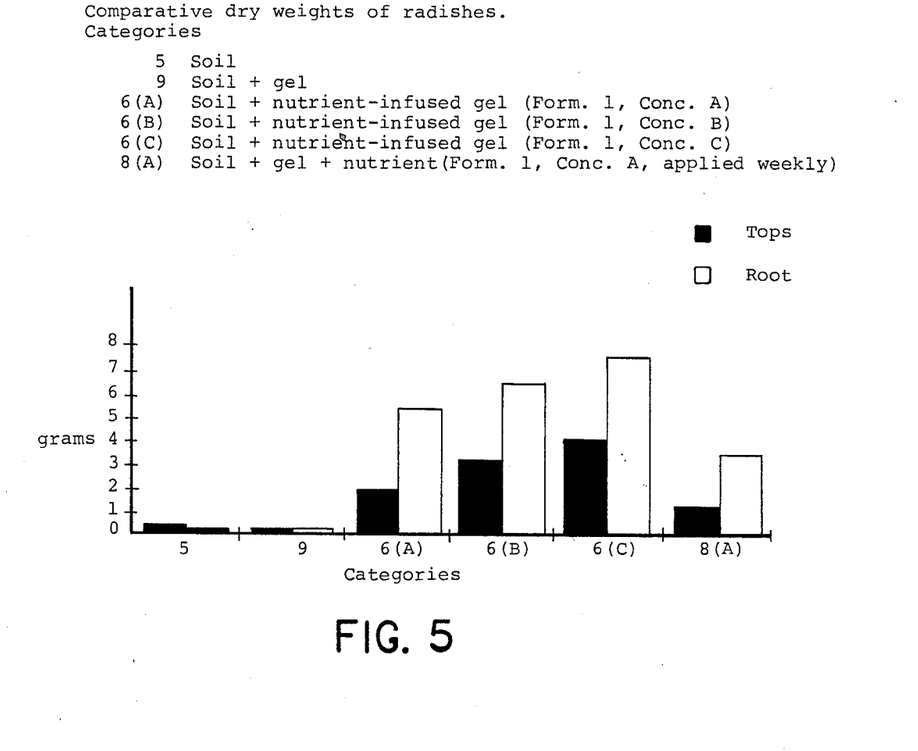

FIGS. 4 and 5 principally show the comparative effects upon plant growth of nutrition infused particles of varying concentrations, and also the relative ineffectiveness of category "3" using initially nutrition free particles in the soil followed by repeated irrigation with nutritive solutions. Category "2" (no polymer particles in soil) is shown even less effective, as would be expected. Tables VIII and IX list the same results as FIGS. 4 and 5 respectively.

TABLE VIII

Nutrient Composition, Formula #1
Comparative Growth of Radishes in 50 days

| Plant | Category | Dry Weight Top (Average of 3 Plants, Grams) | Dry Weight Root (Average of 3 Plants, Grams) |
|---|---|---|---|
| Radish | 1 (Perlite Alone) | 0.072 | 0.023 |
| | 7 (Perlite & Gel) | 0.066 | 0.034 |
| | 4 (Perlite & Nutrition Infused Gel) (Conc. A) | 0.501 | 0.692 |
| | 4 (Perlite & Nutrition Infused Gel) (Conc. B) | 1.355 | 3.235 |
| | 4 (Perlite & Nutrition Infused Gel) (Conc. C) | 1.251 | 3.152 |
| | 2 (Perlite & Nutrient) (Conc. A. added weekly) | 0.451 | 0.429 |

TABLE IX

Nutrient Composition, Formula #1
Comparative Growth of Radishes in 50 days

| Plant | Category | Dry Weight Top (Average of 3 Plants, Grams) | Dry Weight Root (Average of 3 Plants, Grams) |
|---|---|---|---|
| Radish | 5 (Soil) | 0.240 | 0.105 |
| | 9 (Soil, Nutrition Free Gel) | 0.204 | 0.165 |
| | 6 (Soil & Nutrient Infused Gel) (Conc. A) | 1.919 | 5.414 |
| | 6 (Soil & Nutrient Infused Gel) (Conc. B) | 3.244 | 6.535 |
| | 6 (Soil & Nutrient Infused Gel) (Conc. C) | 4.100 | 7.517 |
| | 10 (Soil & Nutrient) (Conc. A. Added Weekly) | 1.403 | 3.335 |

Tables VI through IX represent growth from planted seeds. Tables X shows comparable growth enhancement using commercially germinated seedlings (plugs).

TABLE X

Nutrient Composition Formulas #1 and #3
Comparative Growth of Various Plants from Plugs in 33 days
(Medium - sand, peat and vermiculite, equal parts)
(gms/plant (dry weight))

| | Column* 1. | 2. | 3. | 4. | 5. | 6. |
|---|---|---|---|---|---|---|
| Impatiens Shade | .307 | .655 | 1.056 | 1.158 | 1.557 | 1.308 |
| Rad | .155 | .205 | .255 | .308 | .156 | .456 |
| Petunia | .156 | .105 | 1.557 | 1.055 | 1.005 | 1.407 |
| Regulus | 1.757 | 2.408 | 2.606 | 2.309 | 2.257 | 2.204 |
| Salvia | .107 | .105 | .605 | .604 | .604 | .757 |
| Statice | .707 | .657 | 1.806 | 2.006 | 1.756 | 2.059 |
| Telstar (Impatiens) | .358 | .407 | .804 | 1.004 | .859 | 1.359 |

*Column 1. Medium (Control)
2. Medium + gel
3. Medium + nutrient-infused gel (Formula #1, Conc. A)
4. Medium + nutrient-infused gel (Formula #1, Conc. D)
5. Medium + nutrient-infused gel (Formula #3, Conc. A)
6. Medium + nutrient-infused gel (Formula #3, Conc. D)

The investigations into plant nutrition and growth strongly indicated the great superiority of providing the nutrition in impregnated polymer particle form to the soils. Leaching of nutrient is prevented by its inclusion in the particles, substantially conserving all fertilizer put into the soil. Enhancement of plant growth was markedly superior with the nutrition impregnated polymer approach. The tolerance of most plants to excesses of nutritive salts in the soil was greatly increased. Any excess fertilizer tends to be conserved, because subsequently crops may be grown in the same soil, utilizing the remaining fertilizer trapped in the particles.

The techniques outlined herein allow the impregnation of hydrophilic, water insoluble, swellable polymer with nutrients essential for plant growth. This nutrient-impregnated material has the capacity to swell from water in the soil and slowly releases needed nutrients throughout the growing period for maximum plant growth and development. The impregnated polymer particles are non-toxic to plant root growth allowing root penetration around and through the particles. Specific nutrient polymer formulations can be designed for special growing conditions.

To date, the preponderance of plant growth data has been generated using the amendment based on the polyacrylamide polymer. However, the methods developed are fully applicable to the making of soil amendments based on all known hydrophilic polymers, and the use of all of these are within the scope of the invention. Although some may be more or less effective than others, depending on the magnitude of individual capabilities to tolerate salt solutions of various strengths without molecular alternation, and to bind greater or less amounts of salt solutions, all are capable of producing beneficial soil amendments. Among the other known hydrophilic polymers and classes of polymers are:

Poly(ethylene oxide),
Polyvinyl Pyrrolidone,
Anionic polyacrylamide,
Polyvinylalcohol,
Maleic anhydride-vinylether copolymers,
Polyacrylic acid,
Ethylene-maleic anhydride copolymers,
Polyvinylethers,
Dextran,
Gelatin,
Hydroxy propyl cellulose,
Methyl cellulose,
Carboxymethyl cellulose,
Hydroxyethyl-carboxymethyl cellulose
Hydroxyethyl cellulose,
propyleneglycol alginate,
Sodium alginate,
Polyethyleneimine,
Polyvinyl alkyl pyridinium halifes, e.g. polyvinyl-n-butyl-pyridinium bromide,
Polyproline,
Natural starches,
Casein,
Proteins,
Polymethacrylic acid,
Polyvinylsulfonic acid,
Polystyrene sulfonic acid,
Polyvinylamine,
Ammonium polyacrylates,
Hydroxyalkyl acrylates,
Hydroxyalkyl methacrylates,
Hydroxyalkoxyalkyl acrylates,
Hydroxyalkoxyalkyl methacrylates,
Polyethylene oxide adduct esters of acrylic and methacrylic acids,
Alkoxy acrylates and methacrylates,
Partially hydrolyzed polyacrylamides,
Poly-4-vinylpyridine, polymerized monoesters of olefinic acids, polymerized diesters of olefinic acids, acrylamide and difunctional polymerizable materials, e.g. diacids, diesters or diamides, and the like.

The invention may be embodied in other specific forms and steps without departing from the spirit or essential characteristics thereof. The present embodiments and methods are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of preparing a nutritive soil amendment material containing a plurality of plant nutrition containing salts, comprising the steps:

providing a quantity of water insoluble hydrophilic polymer in granular form, said polymer being non-toxic to plants to be grown and capable of cross linking in the presence of water to become essentially insoluble and capable of undergoing repeated reversible hydration and dehydration cycles;

preparing a quantity of water solution containing a combination including solution compatible salts of said plurality of salts, said solution being of a concentration of each included salt sufficiently dilute that said polymer is capable of said cross linking in its presence to become essentially insoluble and to maintain its capability to undergo repeated reversible hydration and dehydration;

soaking said quantity of polymer in a quantity of said solution, so that said polymer swells to incorporate at least a portion of said solution within its molecular structure;

decanting any remaining unbound solution from the swollen polymer;

heating said polymer to expel the absorbed water therefrom;

repeating the soaking, decanting and drying steps, until the concentration of the salts in the polymer reaches a desired level;

preparing an additional quantity of water solution containing any of the remaining salts which are solution compatible, said additional solution being of a concentration of each included salt sufficiently dilute that said polymer is capable of said cross linking in its presence to become essentially insoluble and to maintain its capability to undergo repeated reversible hydration and dehydration;

soaking said quantity of polymer in a quantity of said additional solution, so that said polymer swells to incorporate at least a portion of said solution within its molecular structure;

decanting any remaining unbound solution from the swollen polymer;

heating said polymer to expel the absorbed water therefrom;

repeating the soaking, decanting and drying steps, until the concentration of the additional salts in the polymer reaches a desired level; and repeating the additional solution preparation, soaking, decanting and drying steps as necessary to incorporate all remaining salts of said plurality thereof into the polymer at the desired level of concentration of each.

* * * * *